(12) United States Patent
Hirakawa et al.

(10) Patent No.: US 6,922,762 B2
(45) Date of Patent: Jul. 26, 2005

(54) CLUSTERING STORAGE SYSTEM

(75) Inventors: Yusuke Hirakawa, Yokohama (JP); Hiroshi Arakawa, Sagamihara (JP); Koji Ozawa, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 223 days.

(21) Appl. No.: 10/223,856

(22) Filed: Aug. 19, 2002

(65) Prior Publication Data

US 2003/0185064 A1 Oct. 2, 2003

(30) Foreign Application Priority Data

Apr. 2, 2002 (JP) ....................................... 2002-099523

(51) Int. Cl.[7] .............................................. G06F 13/00
(52) U.S. Cl. ........................ 711/162; 711/112; 711/114; 711/161
(58) Field of Search ......................... 711/161–162, 112, 711/114

(56) References Cited

U.S. PATENT DOCUMENTS 6,347,078 B1 * 2/2002 Narvaez-Guarnieri et al. ........................... 370/230

2003/0005119 A1 * 1/2003 Mercier et al. .............. 709/225
2003/0023893 A1 * 1/2003 Lee et al. ....................... 714/4

FOREIGN PATENT DOCUMENTS

| EP | 1132805 A2 * | 9/2001 | ............. G06F/3/06 |
| JP | 11-167521 | 6/1999 | |

* cited by examiner

*Primary Examiner*—Mano Padmanabhan
*Assistant Examiner*—John M. Ross
(74) *Attorney, Agent, or Firm*—Townsend and Townsend and Crew LLP

(57) ABSTRACT

A clustering storage system, which enables to operate a plurality of storage system units as a single storage system, presents connection information between clustering storage systems to a user and receives data to be backed up and an instruction about a path between the clustering storage systems from the user. The clustering storage system uses load information or a transfer speed of a data connection line between the storage system units to determine a path between the clustering storage systems used for backup and a storage system unit for holding a backup copy so that the data transfer between the storage system units becomes minimum. Besides, the clustering storage system mainly uses the determined path for backing up the data.

9 Claims, 15 Drawing Sheets

FIG.3

| PORT NO. | STORAGE SYSTEM UNIT NO. | HOST ADAPTER NO. | CONNECTION DESTINATION INFORMATION | CONNECTION DESTINATION NO. | LOGICAL VOLUME NUMBER SET |
|---|---|---|---|---|---|
| 1 | 1 | 1 | DKC | 1 | 1,3,5 |
| 2 | 1 | 2 | HOST | 1 | 1,2 |
| 3 | 2 | 3 | DKC | 2 | 1,3,5 |
| 4 | 2 | 4 | HOST | 2 | 3,4 |
| 5 | 3 | 5 | DKC | 3 | 1,3,5 |
| 6 | 3 | 6 | HOST | 3 | 5,6 |

300 PORT INFORMATION

FIG.4

| LOGICAL VOLUME NO. | VOLUME STATE | FORMAT TYPE | CAPACITY | STORAGE SYSTEM UNIT NO. | STORAGE SYSTEM UNIT INSIDE LOCATION | PAIR NO. |
|---|---|---|---|---|---|---|
| 1 | PRIMARY | OPEN3 | 3 | 1 | 0 | 1 |
| 2 | NORMAL | OPEN6 | 6 | 1 | 3 | 0 |
| 3 | PRIMARY | OPEN6 | 6 | 2 | 0 | 2 |
| 4 | NORMAL | OPEN9 | 9 | 2 | 6 | 0 |
| 5 | PRIMARY | OPEN3 | 3 | 3 | 0 | 3 |
| 6 | NORMAL | OPEN6 | 6 | 3 | 3 | 0 |

400 VOLUME INFORMATION

FIG.5

| PAIR NO. | PAIR STATE | PRIMARY CLUSTERING STORAGE SYSTEM NO. | PRIMARY LOGICAL VOLUME NO. | SECONDARY CLUSTERING STORAGE SYSTEM NO. | SECONDARY LOGICAL VOLUME NO. | PATH NUMBER SET |
|---|---|---|---|---|---|---|
| 1 | NORMAL | 1 | 1 | 2 | 1 | 1,2,3 |
| 2 | NORMAL | 1 | 3 | 2 | 3 | 2,(1,3) |
| 3 | NORMAL | 1 | 5 | 2 | 5 | 3,2,1 |
| 4 | UNASSIGNED | 0 | 0 | 0 | 0 | |
| 5 | UNASSIGNED | 0 | 0 | 0 | 0 | |

500 PAIR INFORMATION

FIG.6

| PATH NO. | PRIMARY CLUSTERING STORAGE SYSTEM NO. | PRIMARY PORT NO. | SECONDARY CLUSTERING STORAGE SYSTEM NO. | SECONDARY PORT NO. | PATH STATE | PAIR NUMBER SET |
|---|---|---|---|---|---|---|
| 1 | 1 | 1 | 2 | 1 | NORMAL | 1,2,3 |
| 2 | 1 | 3 | 2 | 3 | NORMAL | 1,2,3 |
| 3 | 1 | 5 | 2 | 5 | NORMAL | 1,2,3 |

600 PRIMARY-TO-SECONDARY PATH INFORMATION

FIG.7

| STORAGE SYSTEM UNIT NO.A / STORAGE SYSTEM UNIT NO.B | 1 | 2 | 3 |
|---|---|---|---|
| 1 | 0 | 1 | 2 |
| 2 | 1 | 0 | 1 |
| 3 | 2 | 1 | 0 |

700 DISTANCE INFORMATION BETWEEN STORAGE SYSTEM UNITS

FIG.9

| LOGICAL VOLUME NO. | VOLUME STATE | FORMAT TYPE | CAPACITY | STORAGE SYSTEM UNIT NO. | STORAGE SYSTEM UNIT INSIDE LOCATION | PAIR NO. |
|---|---|---|---|---|---|---|
| 1 | SECONDARY | OPEN3 | 3 | 1 | 0 | 1 |
| 2 | UNASSIGNED | OPEN6 | 6 | 1 | 3 | 0 |
| 3 | SECONDARY | OPEN6 | 6 | 2 | 0 | 2 |
| 4 | UNASSIGNED | OPEN6 | 6 | 2 | 6 | 0 |
| 5 | SECONDARY | OPEN3 | 3 | 3 | 0 | 3 |
| 6 | UNASSIGNED | OPEN3 | 3 | 3 | 3 | 0 |

400 VOLUME INFORMATION

FIG.10

| PORT NO. | STORAGE SYSTEM UNIT NO. | HOST ADAPTER NO. | CONNECTION DESTINATION INFORMATION | CONNECTION DESTINATION NO. | LOGICAL VOLUME NUMBER SET |
|---|---|---|---|---|---|
| 1 | 1 | 1 | DKC | 1 | 1,3,5 |
| 2 | 1 | 2 | NON | 0 | |
| 3 | 2 | 3 | DKC | 2 | 1,3,5 |
| 4 | 2 | 4 | NON | 0 | |
| 5 | 3 | 5 | DKC | 3 | 1,3,5 |
| 6 | 3 | 6 | NON | 0 | |

300 PORT INFORMATION

| STORAGE SYSTEM UNIT NO. \ STORAGE SYSTEM UNIT NO. | 1 | 2 | 3 |
|---|---|---|---|
| 1 | 0 | 1 | 2 |
| 2 | 1 | 0 | 1 |
| 3 | 2 | 1 | 0 |

700 DISTANCE INFORMATION BETWEEN STORAGE SYSTEM UNITS

CLUSTERING STORAGE SYSTEM

BACKGROUND OF THE INVENTION

The present invention relates to a storage system, and more particularly to a backup of data among a plurality of storage systems.

A conventional technology of such a storage system is disclosed in JP-A-11-167521. This publication discloses a storage system which has an interface (host adapter, CHA) to a higher level device such as a host computer, an interface (disk adapter, DKA) to a storage in a storage system, a cache memory (CACHE) and a shared memory (SM), which are interconnected by a common path system.

To extend the storage system disclosed in the above publication, there is proposed a technology for interconnecting a plurality of storage systems. Such a configuration is called a clustering storage system. And, the individual storage systems configuring the clustering storage system are called storage system units.

Meanwhile, there is another technology which disposes a separate storage system physically away from a storage system for holding data on the assumption that the storage system may be broken because of a disaster or the like and physically connects them through a telephone line or the like. According to this technology, one storage system holds (backs up) a copy of data which is stored in the other storage system. For example, even if one of the storage systems is broken and its data becomes unusable, the other storage system can be used to quickly resume the use of the data.

SUMMARY OF THE INVENTION

Backup of data between the above clustering storage systems will be described.

In this case, the clustering storage systems are connected through multiple paths, and any of them is used to back up data. But, the conventional path used for backup is set without considering the structure of a backup source clustering storage system and that of a backup destination clustering storage system. Therefore, it may be necessary to transfer data between the storage system units within the backup source or the backup destination clustering storage system depending on which path is set. Because the data transfer between the storage system units is slower than that within the storage system unit, there is a drawback that a response (access performance) of the clustering storage system to I/O processing of data and backup processing take much time (degradation in backup performance).

It is an object of the invention to solve the drawbacks of the aforesaid clustering storage systems and to improve access performance and the like of the clustering storage systems.

The present invention is directed to a method of copying data from one clustering storage system to another clustering storage system in a storage system which is comprised of connecting a plurality of clustering storage systems having a plurality of storage system units. This method has the following steps. Specifically, a data transfer route from one clustering storage system to another clustering storage system is searched, the data transfer route is determined according to the searched result, data is transferred from the one clustering storage system to the other clustering storage system through the determined data transfer route, and the transferred data is stored in the other clustering storage system.

Specifically, the clustering storage system (backup source clustering storage system) receives information, which indicates data to be backed up and backup destination clustering storage system, from a user. The backup source clustering storage system checks whether the indicated clustering storage system is usable as a backup destination and also checks the condition of paths between the backup source clustering storage system and the indicated clustering storage system.

Based on information about the checked state of connected paths, the backup source clustering storage system determines the path between the backup source clustering storage system and the backup destination clustering storage system and the storage system unit and logical volume possessed by the backup destination clustering storage system. The user instructs the source clustering storage system to back up data by using the determined path and logical volume.

The data transfer route may be determined according to connection information between the clustering storage systems and distance information between the storage system units possessed by the clustering storage systems. The distance information between the storage system units includes indexes indicating easiness of data transfer between the storage system units, such as the reciprocal of a speed of data transfer between the storage system units, time of use of connection line between the storage system units in unit time, and the like.

There may be a configuration that a priority is given to the searched paths to register a plurality of paths as paths to be used for the data transfer. The clustering storage system selects a path to be used for the data transfer according to the priority given to the respective paths.

There may also be a configuration having means for showing information about the searched path or the like to the user before the clustering storage system determines the data transfer route.

When data is to be backed up between the clustering storage systems, the data is transferred through the path determined by the clustering storage system. When the priority is given to the paths, the priority must be observed.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram illustrating an example of port information;

FIG. 4 is a diagram illustrating an example of volume information;

FIG. 5 is a diagram illustrating an example of pair information;

FIG. 6 is a diagram illustrating an example of primary-to-secondary path information;

FIG. 7 is a diagram illustrating an example of information about a distance between storage system units;

FIG. 9 is a diagram illustrating an embodiment of volume information;

FIG. 10 is a diagram illustrating an embodiment of port information;

DESCRIPTION OF THE EMBODIMENTS

Embodiments of a computer system according to the present invention will be described in detail with reference to the accompanying drawings. In the embodiments, a maintenance terminal may be disposed within or outside the clustering storage system. In either case, the maintenance terminal may be connected to the respective storage system units by some type of means.

Figure 1:
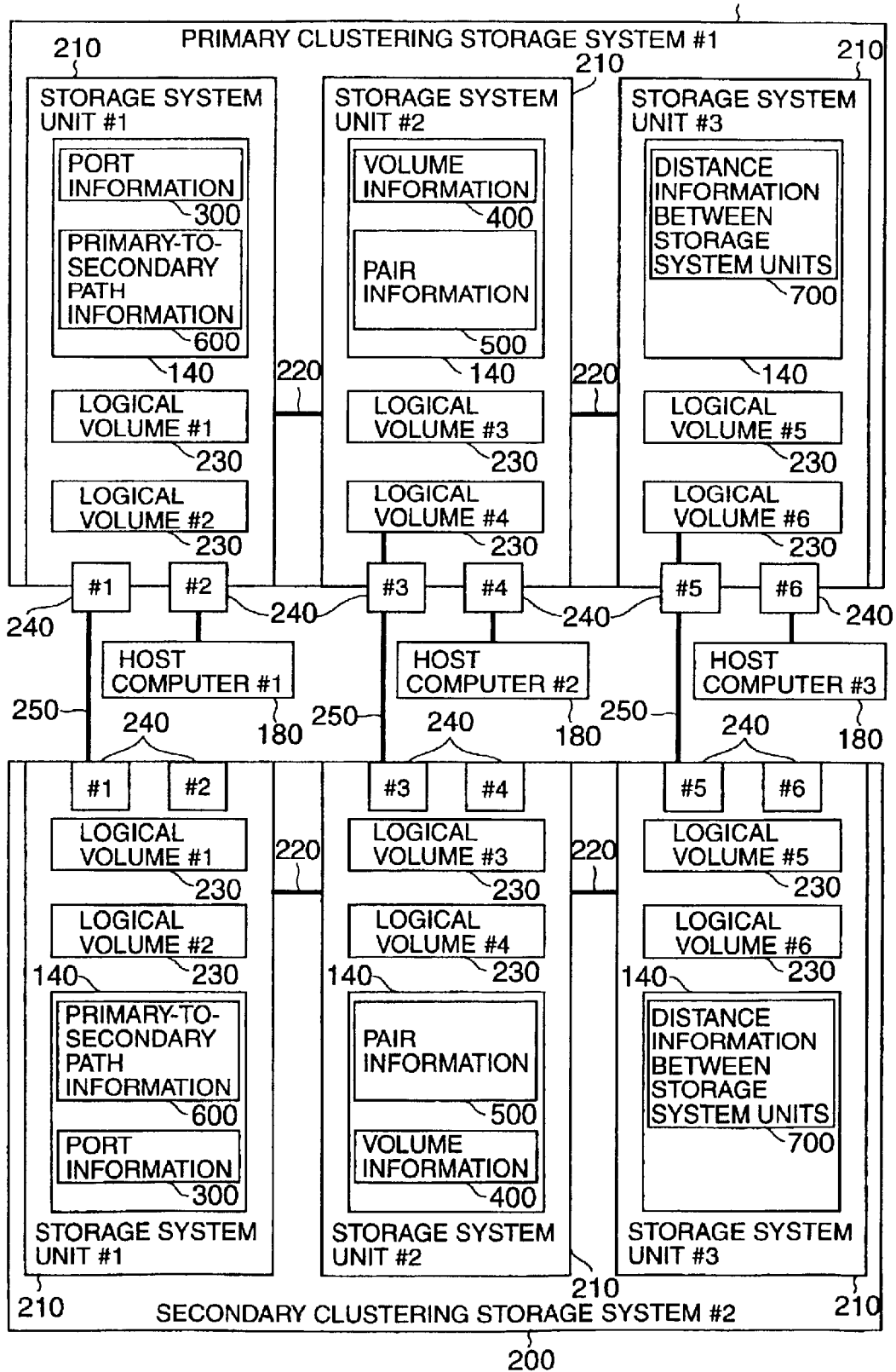
FIG. 1 is a block diagram of an embodiment of a computer system of the present invention.

FIG. 1 is a diagram showing a structure of one embodiment of the computer system to which the present invention is applied.

This embodiment is configured to have host computers 180 and a plurality of clustering storage systems 200 connected by paths 250. It is assumed in the following description that the clustering storage system 200 which holds original data, namely becomes a backup source, is a primary clustering storage system 200, and the clustering storage system 200 which becomes a backup destination of the original data is a secondary clustering storage system 200.

The clustering storage system 200 has at least one storage system unit 210 and an unshown maintenance terminal. A connection line 220 connects the storage system units 210. The maintenance terminal is connected to all the storage system units 210 by a dedicated line. The storage system unit 210 of the clustering storage system 200 has port information 300, volume information 400, pair information 500, primary-to-secondary path information 600 and distance information 700 between storage system units.

Such information may be collectively stored in a single storage system unit 210 or stored in the multiple storage system units 210 at the same time. FIG. 1 shows an example that each piece of information is stored in each of the storage system units. It is desirable that such information is stored in a plurality of shared memories as insurance against, for example, a failure of any of the shared memories of the storage system unit 210.

The clustering storage system 200 can give such information to another clustering storage system 200 through the paths 250. The clustering storage system 200 can also give such information to the host computers 180 connected via ports 240.

A physical storage area of the clustering storage system 200 is logically divided for management. Each of the divided logical storage areas is called a logical volume 230. A capacity of the logical volume 230 and a physical storage location (physical address) of the logical volume in the clustering storage system 200 can be designated by the user using the maintenance terminal or the host computer 180. The physical address of each logical volume 230 is stored in the volume information 400. The logical volume 230 may be disposed over a plurality of storages 150 (see FIG. 2) within a single storage system unit 210. It is assumed in the following description that the original logical volume 230 as a backup source is a primary logical volume, and the logical volume 230 as a backup destination is a secondary logical volume.

Figure 2:
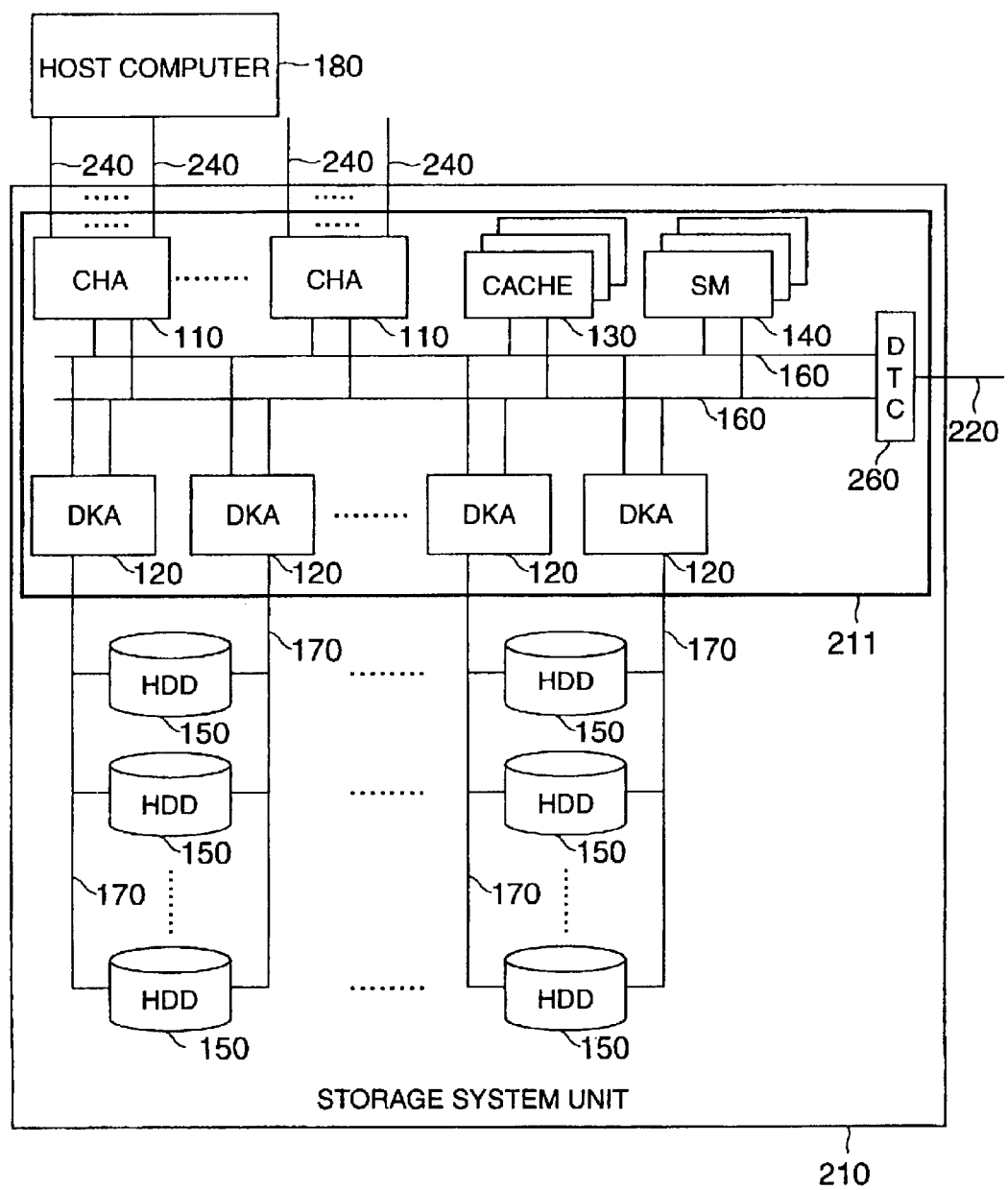
FIG. 2 is a block diagram of the storage system unit.

FIG. 2 is a diagram showing an inside structure of the storage system unit 210. The storage system unit 210 has a plurality of storages 150 and a control section 211. The control section 211 has CHAs 110 which are interfaces with higher level devices, DKAs 120 which are interfaces with the storages 150, CACHEs 130, SMs 140, and a data transfer controller (DTC) 260 which allows the storage system unit 210 to communicate with another storage system unit 210. Such devices are interconnected by a common path 160.

The common paths 160 have a redundant path for the countermeasure against a failure of the common paths 160. The individual devices such as the CHAs 110 may also have a redundant device, namely all the devices may be disposed in two or more. The DKAs 120 and the storages 150 are interconnected by connection lines 170. It is not shown but the maintenance terminal is connected to all of the CHAs 110 and the DKAs 120 through a dedicated line for setting, monitoring, maintenance, etc. of the clustering storage system 200.

The CHAs 110 control the data transfer between the host computer 180 and the CACHEs 130. The CHAs 110 have a plurality of ports 240 for connection with the host computer 180. The DKAs 120 control the data transfer between the CACHEs 130 and the storages 150. The CACHEs 130 are memories for temporarily holding data received from the host computer 180 or data read from the storages 150. The SM 140 is a memory which is shared by all the CHAs 110 and DKAs 120 in the clustering storage system 200, namely usable by all the CHAs and the like.

The SM 140 stores information such as port information 300. The CHAs 110 and the DKAs 120 communicate with the CHAs 110 and the DKAs 120 possessed by the control section 211 in another storage system unit 210 through the DTC 260 and the connection line 220 between the storage system units. The CHAs 110 and the DKAs 120 can use the CACHEs 130 and the SMs 140 possessed by the control section 211 in the other storage system unit 210 through the DTC 260 and the connection line 220 between the storage system units.

FIG. 3 is a diagram showing the contents of the port information 300 possessed by the clustering storage system 200. The port information 300 is stored in a memory, to which the CHAs 110 can refer, and specifically stored in the SM 140. As described above, the port information 300 is recommended to be stored in the SM 140 or the like possessed by a single or plural storage system units 210 among the storage system units 210 possessed by the clustering storage system.

The port information 300 is a table which stores information indicating the connected states of the ports 240 possessed by the clustering storage system 200. Therefore, the clustering storage system 200 can check which of its own ports is connected with which device by referring to the port information 300.

The port information 300 stores information indicating numbers of the storage system units 210 having the built-in ports 240, numbers of the CHAs 110 which control the ports 240, connection destination information and connection destination numbers for identifying connection destinations of the ports 240, and logical volume number sets which are accessed via the ports 240.

The connection destination information is information indicating any of "HOST", "DKC" and "NON". When the port 240 is connected to the host computer 180, the connection destination information corresponding to the port 240 is "HOST". When the port 240 is connected to another clustering storage system 200, connection destination information corresponding to the port 240 is "DKC". When the port 240 is not connected to anything, connection destination information corresponding to the port 240 is "NON".

The connection destination number is effective only when the connection destination information is "HOST" or "DKC". When the connection destination information is "HOST", a number specifying the host computer 180 which is connected to the port 240 is set to the corresponding connection destination number. When the connection destination information is "DKC", a path number to be described later is set to the corresponding connection destination number.

FIG. 3 specifically shows the following connection examples. A port 1 belongs to a storage system unit 1, and it is controlled by a CHA 1 and connected to a clustering storage system 2 indicated by path number 1. Further, the port 1 is used to access to logical volumes 1, 3, 5. A port 2 belongs to the storage system unit 1 and it is controlled by a CHA 2 and connected to the host computer 180 corresponding to a host computer number 1. In addition, the host computer 1 accesses to logical volumes 1, 2 through the port 2.

FIG. 4 is a diagram showing an example of the volume information 400. The volume information 400 is a table which stores information indicating states of logical volumes possessed by the clustering storage system 200. The volume information 400 stores information indicating volume states, format types, capacities, a storage system unit number, storage system unit inside locations, and pair numbers. The volume information 400 is stored in a memory, e.g., the SM 140, which the CHA 110 can refer to. As described above, the volume information 400 is recommended to be stored in the SM 140 or the like which is possessed by a single or plural storage system units 210 among the storage system units 210 possessed by the clustering storage system.

The volume state is information indicating any of "normal", "primary", "secondary", "abnormal" or "unassigned". The logical volume 230 in the volume state of "normal" or "primary" is a logical volume which can be normally accessed from the host computer 180. The logical volume 230 in the volume state of "primary" is a backup source logical volume 230 to be backed up. The logical volume 230 in the volume state of "secondary" is a backup destination logical volume 230 used for backup.

The logical volume 230 in the volume state of "abnormal" is a logical volume 230 to which the host computer 180 cannot access normally because of a failure. The failure means, for example, a malfunction of the storage 150 which is allotted to the logical volume 230. The logical volume 230 in the volume state of "unassigned" is a logical volume 230 which is not used by the host computer.

A physical location of the logical volume 230 within the clustering storage system 200 is specified by two pieces of information about the storage system unit number and the storage system unit inside location. Specifically, the logical volume 230 is stored having a location as the front which is displaced as indicated by the storage system unit inside location from the front within the storage system unit 210 corresponding to the storage system unit number.

The pair number is information which is effective when the volume state is "primary" or "secondary" and specifies the pair information 500 to be described later.

Specifically, the logical volume 1 in FIG. 4 shows that the format type is OPEN 3, the capacity is 3 GB (gigabyte), it is stored from the front of the storage system unit 1, it can be accessed from the host computer, and it is a backup source logical volume. It is also indicated that information of pair number 1 of the pair information 500 is referred for information about the backup of the logical volume 1.

It is shown that the logical volume 2 has a format type of OPEN 6 and a capacity of 6 GB, it is stored from a position of 3 GB away from the front within the storage system unit 1, and it is not to be backed up.

FIG. 5 is a diagram showing an example of the pair information 500. The pair number 500 is a table which stores each piece of information about the primary logical volume and the secondary logical volume, which are in a backup relation (namely, paired), in a related form. The pair information 500 stores information indicating pair states, primary clustering storage system numbers, primary logical volume numbers, secondary clustering storage system numbers, secondary logical volume numbers, and path number sets.

The pair information 500 is stored in a memory, e.g., SM 140, to which the CHA 110 can refer. As described above, the pair information 500 is recommended to be stored in the SM 140 or the like which is possessed by a single or plural storage system units 210 among the storage system units 210 possessed by the clustering storage system.

The pair state is information indicating any of "normal", "abnormal" and "unassigned". A pair in the pair state of "normal" is a backup pair having the primary logical volume 230 backed up normally. A pair in the pair state of "abnormal" is a backup pair having the primary logical volume 230 not backed up because of a failure. The failure is, for example, a break in the path 250. The pair state of "unassigned" indicates that information about the pertinent pair number is not effective.

The primary clustering storage system number is a number which specifies the primary clustering storage system 200 holding the primary logical volume 230. The secondary clustering storage system number is a number which specifies the secondary clustering storage system 200 holding the secondary logical volume 230.

The path number set includes information indicating a path number designated by primary-to-secondary path information 600 to be described later for specifying the path 250 used for backup. The path 250 for connecting the clustering storage systems 200 may be multiple, so that a plurality of path numbers may be contained in the path number set. A priority is given to the path numbers in the path number set by path allocation processing to be described later. The paths in the path number set are used from those having a higher priority. The paths having the same priority are used equally. In FIG. 5, the path numbers in the pair number set are sequentially arranged from the one with a higher priority level. Those having the same priority are put in parentheses.

Specifically, FIG. 5 shows that pair information 1 uses logical volume 1 of a secondary clustering storage system 2 as a copy destination of the logical volume 1 of the clustering storage system 1 and the backup is normally made. It is also shown that path 1 corresponding to path number 1 is used to back up the data, path 2 corresponding to path number 2 is used when the path 1 has a failure, and path 3 corresponding to path number 3 is used when the path 2 has a failure.

FIG. 6 is a diagram showing an example of the primary-to-secondary path information 600. The primary-to-secondary path information 600 is a table which stores information about the paths between the ports of the primary clustering storage system and the secondary clustering storage system. The primary-to-secondary path information 600 stores information indicating primary clustering storage system numbers, primary port numbers, secondary clustering storage system numbers, secondary port numbers, path states, and pair number sets. The primary-to-secondary path information 600 is stored in a memory, e.g., SM 140, to which the CHA 110 can refer. As described above, the primary-to-secondary path information 600 is recommended to be stored in the SM 140 or the like which is possessed by a single or plural storage system units 210 among the storage system units 210 possessed by the clustering storage system.

The primary-to-secondary path information 600 is information indicating a physically connected relation between the port 240 indicated by the primary port number and the port 240 indicated by the secondary port number. The primary port 240 is a port 240 in the primary clustering storage system 200 corresponding to the primary clustering storage system number. The secondary port 240 is a port 240 in the secondary clustering storage system 200 corresponding to the secondary clustering storage system number.

The path state is information indicating any of "normal" and "abnormal". When the path state is "normal", it indicates that the corresponding path is normal and usable. When the path state is "abnormal", it indicates that the corresponding path cannot be used because of a failure. The failure means, for example, a break in the path 250, a malfunction of the port 240 or the like.

The pair number set is a set of pair numbers indicating pairs of backup using the corresponding paths. A single path 250 can be used for backup of a plurality of logical volumes 230, so that the pair number set may hold a plurality of pair numbers.

Specifically, FIG. 6 shows that the path number 1 indicates the connection between the port 1 of the clustering storage system 1 and the port 1 of the secondary clustering storage system 2. Besides, the path state is "normal", and the path of the path number 1 is usable. It is also indicated that the path of the path number 1 is used for backup of the logical volume 230 corresponding to the pair numbers 1, 2, 3 of the pair number set.

FIG. 7 is a diagram showing a specific example of the distance information 700 between the storage system units. The distance information 700 between the storage system units is a table which stores distances between the storage system units in the clustering storage system 200. The distance between the storage system units of the storage system unit 1 and the storage system unit 2 is determined to be, for example, the reciprocal of a data transfer speed between the storage system unit 1 and the storage system unit 2. Specifically, it is information indicating easiness of the data transfer between the storage system units. A smaller figure indicates that the data transfer is easier.

It is defined that when the storage system unit 1 and the storage system unit 2 are the same, the distance between the storage system units is zero. When two storage system units 210 are not connected directly, the distance between the storage system units must be a minimum value of the sum of the distances between the storage system units via another storage system unit 210.

FIG. 7 shows distances between the storage system units when a transfer speed between the storage system unit 1 and the storage system unit 2 is 1 Mbps, a transfer speed between the storage system unit 1 and the storage system unit 3 is 0.5 Mbps, and a transfer speed between the storage system unit 2 and the storage system unit 3 is 1 Mbps. In FIG. 7, a distance between the storage system units of a storage system unit number A and a storage system unit number B is held in the intersection of column A and row B.

The distance between the storage system units may be represented by the period of time when the connection line 220 between the storage system unit 1 and the storage system unit 2 is used within unit time. But, when the storage system unit 1 and the storage system unit 2 are the same as in the case of the transfer speed, the distance between the storage system units is determined to be zero. For example, the clustering storage system 200 adds time when the connection line 220 between the storage system units 210 is used for each access instruction from the host computer 180 to the distance information 700 between the storage systems to calculate the distance between the storage system units.

And, information about the priority of the path number set of the pair information 500 may be changed every unit time by the same way as the path allocation processing to be described later. Thus, the path 250 using the connection line 220 between the storage system units can be selected according to a change in load of the path 250.

Figure 8:
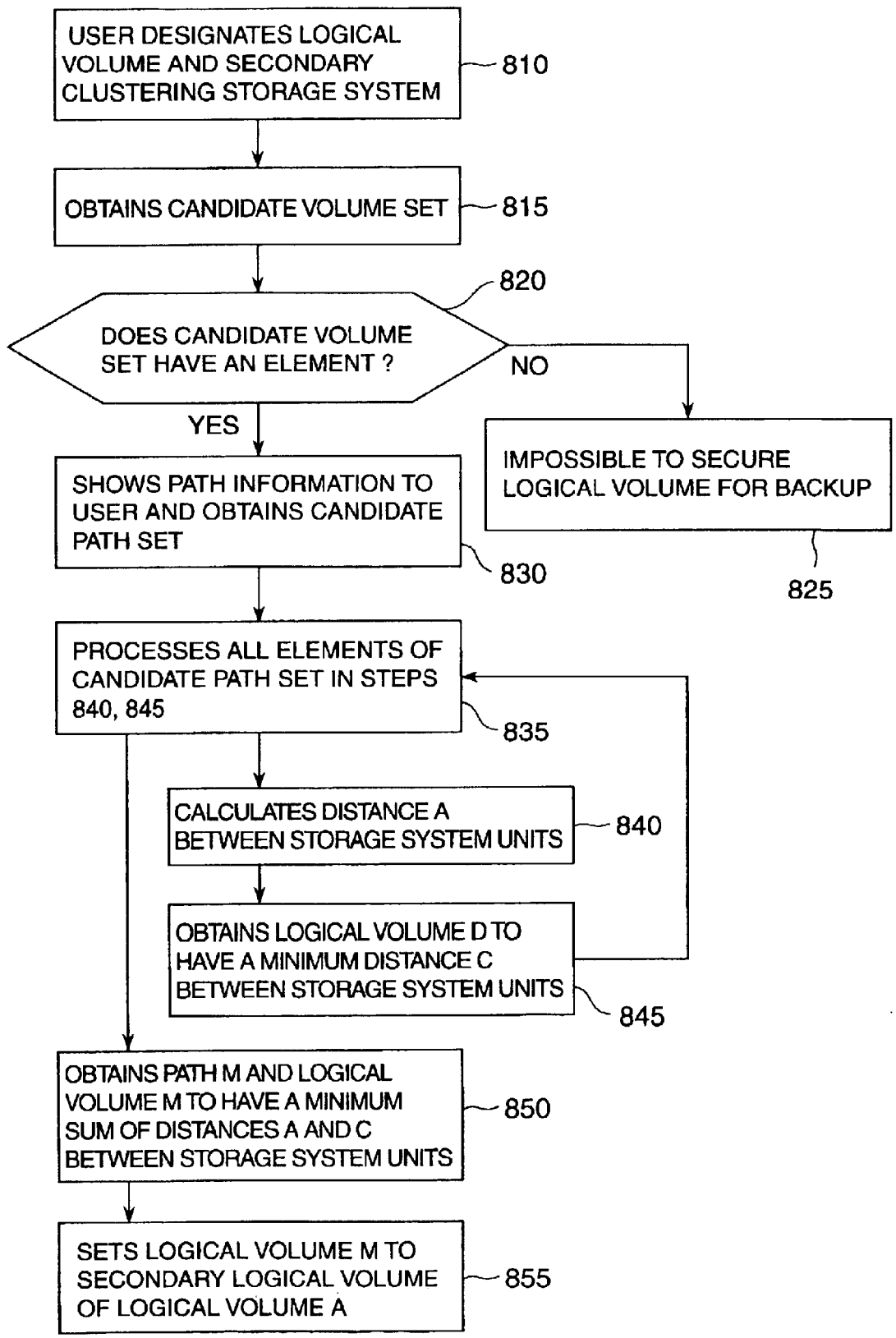
FIG. 8 is a flowchart of path allocation processing.

FIG. 8 is a flow chart showing a flow of path allocation processing when the logical volume 230 is set as a backup source logical volume for the primary clustering storage system 200. This processing is performed to first configure the storage system or to review the constituents of the storage system. This process is also performed to set a new logical volume in the storage system. The path allocation processing corresponds to a process of allotting the data transfer route between the corresponding logical volume and the clustering storage system to a given logical volume.

The user uses the maintenance terminal or the host computer 180 to designate the backup source logical volume 230 and the backup destination secondary clustering storage system 200 to the primary clustering storage system 200. It is assumed in the following description that the user designated logical volume 230 is a logical volume A, and the secondary clustering storage system is a secondary clustering storage system C. It may also be configured in such a way that the secondary clustering storage system 200 is not designated by the user, but all the clustering storage systems 200 other than the primary clustering storage system 200 are secondary clustering storage systems 200 (step 810).

The primary clustering storage system 200 checks whether the logical volume A can be backed up to the secondary clustering storage system C. Specifically, the primary clustering storage system 200 refers to the volume information 400 which is possessed by the secondary clustering storage system C to check that the format type is equal to that of the logical volume A, the capacity is equal to that of the logical volume A, and there is a logical volume 230 with a volume state of "unassigned". In the following description, the set of logical volumes 230 satisfying the above conditions is called a candidate volume set.

For example, when the user designated logical volume A is the logical volume 2 of the volume information 400 shown in FIG. 4, the secondary clustering storage system C is the secondary clustering storage system 2, and a volume structure of the secondary clustering storage system 2 is based on the volume information 400 shown in FIG. 9, the candidate volume set comprises the logical volume 2 and the logical volume 4 (step 815).

When there is not a logical volume 230 satisfying the conditions in step 820, the primary clustering storage system 200 presents to the user through the maintenance terminal or the host computer 180 that backup cannot be made to the secondary clustering storage system C. The user considers adding the storage capacity of the secondary clustering storage system C, changing the secondary clustering storage system C which is to be a backup destination to another clustering storage system, or the like (step 825).

When there is a logical volume 230 which satisfies the conditions in step 820, the path 250 between the primary clustering storage system 200 and the secondary clustering storage system C, which is used for backup, is specified. The primary clustering storage system 200 sends the primary-to-secondary path information 600 to the maintenance terminal or the host computer 180. The maintenance terminal or the host computer 180 presents the sent primary-to-secondary path information 600 to the user.

Figures 11, 12:
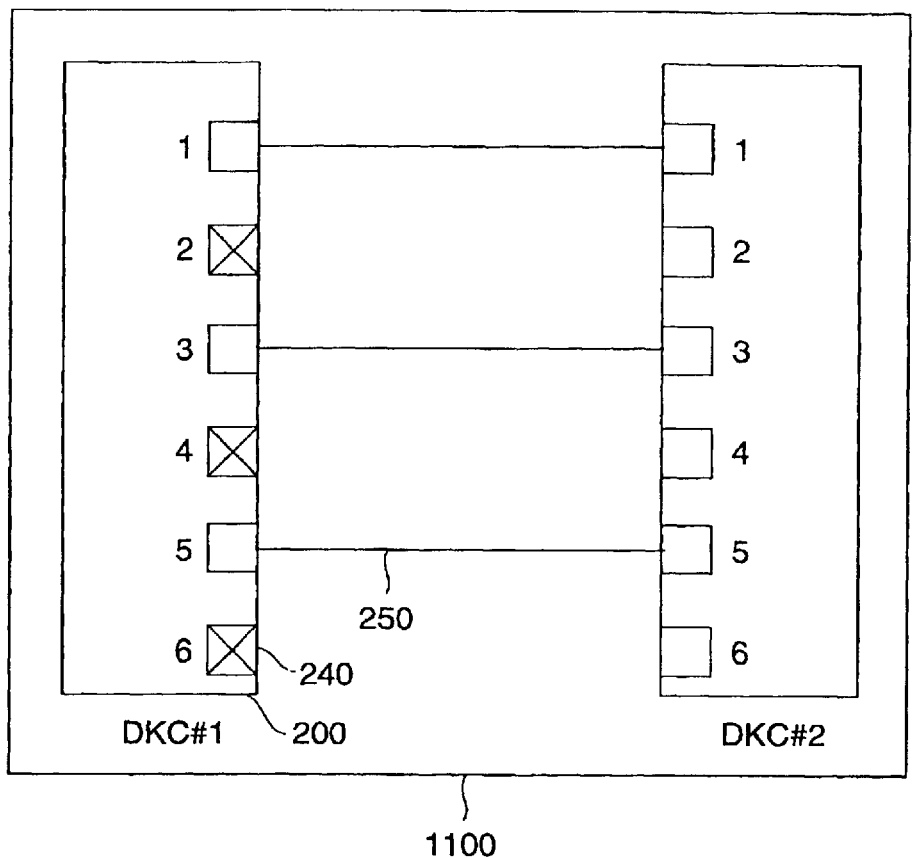
FIG. 11 is a diagram illustrating an example of presentation of primary-to-secondary path information.
FIG. 12 is a diagram illustrating an embodiment of information about a distance between storage system units.

FIG. 11 is a diagram showing an example presentation of the primary-to-secondary path information 600 to the user when the port of the primary clustering storage system is in the state indicated by the port information 300 of FIG. 3, the port of the secondary clustering storage system C is in the state indicated by the port information 300 of FIG. 10, the pair state of the primary clustering storage system 200 and the secondary clustering storage system C is in the state indicated by the pair information 500 of FIG. 5, and the primary-to-secondary path information is in the state indicated by the primary-to-secondary path information 600 of FIG. 6.

In FIG. 11, the port number is shown next to the port 240, and mark X is given to the port 240 which cannot be used because of a failure or the like or the port 240 which is connected to the host computer 180 or the clustering storage system 200 other than the user designated secondary clustering storage system C.

The path 250 between the primary clustering storage system 200 and the secondary clustering storage system C is indicated by a solid line which connects the ports 240 in FIG. 11. FIG. 11 shows that the port 1 of the primary clustering storage system 1 and the port 1 of the secondary clustering storage system C are connected, the port 3 of the primary clustering storage system 1 and the port 3 of the secondary clustering storage system C are connected, and the port 5 of the primary clustering storage system 1 and the port 5 of the secondary clustering storage system C are connected.

The user indicates at least one path 250 which is used for backup to the primary clustering storage system 200 through the maintenance terminal or the host computer 180. The indicated path 250 is comprised in a candidate path set. It may be configured that the instruction about the candidate path set is not received from the user, but all the paths 250 between the primary clustering storage system 200 and the secondary clustering storage system C may be determined as the candidate path set (step 830). When the clustering storage system 200 automatically determines a candidate path set and a final path, the step of presenting to the user shown in FIG. 11 may be omitted.

The primary clustering storage system 200 performs the following processing on all the paths of the candidate path set. It is assumed in the following description that the paths of the candidate path set are called candidate paths.

First, the primary clustering storage system 200 uses the port information 300 of the primary clustering storage system 200 to determine a storage system unit B which has a built-in primary port B of the candidate path. Then, the primary clustering storage system 200 determines a storage system unit A which has a built-in logical volume A by the volume information 400 of the primary clustering storage system 200. The primary clustering storage system 200 obtains a distance A between the storage system unit A and the storage system unit B by the distance information 700 between the storage system units of the primary clustering storage system 200.

For example, when the user designated logical volume A is the logical volume 2 of the volume information 400 shown in FIG. 4, the candidate path is the path 1 shown in FIG. 6, the port information 300 is shown in FIG. 3, and the distance information 700 between the storage system units is the example shown in FIG. 7, the storage system unit A is the storage system unit 1, the storage system unit B also is the storage system unit 1, and the distance A between the storage system units is zero.

When the candidate path is the path 2 shown in FIG. 6 under the same conditions, the storage system unit A becomes the storage system unit 1, the storage system unit B becomes the storage system unit 2, and the distance A between the storage system units is 1 (steps 835, 840).

The primary clustering storage system determines the storage system unit C which has a built-in secondary port C of the candidate path by the port information 300 of the secondary clustering storage system C. The primary clustering storage system 200 determines the storage system unit D having a built-in logical volume D on all logical volumes D of the candidate volume set. Besides, the primary clustering storage system 200 obtains the distance C between the storage system unit C and the storage system unit D by the distance information 700 between the storage system units of the secondary clustering storage system C. The primary clustering storage system 200 stores the values of the logical volume D and the distance C between the storage system units so that the distance between the storage system units becomes minimum. The primary clustering storage system 200 obtains information, which is stored in the port information 300 or the like stored in the secondary clustering storage system 200, through the path 250.

For example, when the candidate volume set is the logical volume 2 and the logical volume 4 shown in FIG. 9, the candidate path is the path 2 shown in FIG. 6, the port information 300 is shown in FIG. 10, and the distance information 700 between the storage system units is the example shown in FIG. 12, the storage system unit C is the storage system unit 2. Because the storage system unit D in which the logical volume 2 which is one of the candidate volumes is stored is the storage system unit 1, the distance C between the storage system units is 1. Because the storage system unit D, in which the logical volume 4 which is one of the candidate volumes is stored, is the storage system unit 2, the storage distance B between the system units is zero.

To compare with the considered results of another path 250, the primary clustering storage system 200 stores the considered results on the path 2, namely information that the logical volume 4 has a minimum distance C between the storage system units in the path 2 and its distance C between the storage system units is zero. The primary clustering storage system 200 stores the above information about all the candidate paths. Thus, the primary clustering storage system 200 can find the logical volume 230 which has a minimum distance C between the storage system units in the secondary clustering storage system C on all the candidate paths (step 845). Thus, the distance between the storage system units within the primary clustering storage system and within the secondary clustering storage system is calculated.

Then, the primary clustering storage system 200 compares the sums of the distance A between the storage system units and the distance C between the storage system units of all the candidate paths to find a path M having a minimum sum and determines the logical volume D corresponding to the path M as the secondary logical volume M. By determining the sum of the distance A between the storage system units and the distance C between the storage system units, the distance between the storage system units, namely the path M and the secondary logical volume M having minimum transfer time between the storage system units, can be found in the primary clustering storage system A and the secondary clustering storage system C as the whole (step 850).

Then, the primary clustering storage system 200 obtains a pair number (hereinafter called "pair number M") of the pair information 500 in the pair state of "unassigned" and updates the port information 300, pair information 500, volume information 400 and primary-to-secondary path information 600 of the primary clustering storage system 200 as described below. It is assumed in the following description that the primary port number of the path M is a primary port M.

In the port information 300, a logical volume A is added to the logical volume number set of the primary port M. In the pair information 500, respective items of the pair number M are changed. Specifically, the pair state is changed to "normal", a number corresponding to the primary clustering storage system 200 is set to the primary clustering storage system number, a number indicating the logical volume A is set to the primary logical volume number, the clustering storage system C is set to the secondary clustering storage system number, and the logical volume M is set for the secondary logical volume number. Not only the path M but all the candidate paths are set for the path number set of the pair number M.

In this embodiment, the highest priority, which is 1 here, is given to the path M. The priority of the remaining paths is determined according to, for example, in increasing order of the distance between the storage system unit C which has a built-in secondary port C of paths other than the path M and the storage system unit M containing a logical volume M. Thus, by giving the priority to the paths 250, an optimum path 250 can be used when the path M has a failure. It may also be configured not to give a priority to the paths. And, it is recommended that only the path M is registered for the path set number. It may be configured to select a path at random if the path M cannot be used.

But, the path to be selected at random must be connected to the secondary clustering storage system and normal, so that it is necessary to check whether the path to be selected meets the above conditions. Therefore, the primary clustering storage system 200 obtains the logical volume number from an access instruction, the pair number from the volume information corresponding to the logical volume number, and the secondary clustering storage system number of the secondary logical volume from the pair information corresponding to the pair number. Besides, the primary clustering storage system 200 can obtain a path other than the path M by checking a port accessible to the secondary clustering storage system from the port information and the primary-to-secondary path information to obtain information about the path satisfying the above conditions.

In the volume information 400, the volume state and pair number of the logical volume A are changed. Specifically, the volume state is set to "primary", and the pair number M is set for the pair number. The pair number M is added to the pair number set of the path M of the primary-to-secondary path information 600.

Besides, the primary clustering storage system 200 notifies the secondary port C and the path M to the secondary clustering storage system C and instructs the following processing.

The secondary clustering storage system C updates the volume information 400 and the port information 300 as follows. Specifically, the volume state of the logical volume M of the volume information 400 is set to "secondary", and the pair number M is set for the pair number. And, the logical volume M is added to the logical volume set of the secondary port number C of the port information 300 (step 855).

In the above path allocation processing, the user designated secondary clustering storage system C is one, but a plurality of secondary clustering storage systems C may be designated. In this case, step 835 to step 850 of FIG. 8 are performed for every secondary clustering storage system to determine the secondary clustering storage system C, the path M, and the logical volume M, having the minimum sum of the distance A between the storage system units and the distance C between the storage system units. Thus, even when there are many secondary clustering storage systems 200, the logical volume 230 can be backed up with ease by the optimum secondary clustering storage system 200, path 250 and secondary logical volume 230.

In the above path allocation process, the CHA 110 or the DKA 120 of the control section 211 in the primary clustering storage system 200 automatically determines the optimum path 250 and secondary logical volume 230.

But, it may be configured that before the optimum path or the like is determined by the primary clustering storage system 200, the storage system unit number A having a built-in copy source logical volume A, the storage system unit number M having a built-in primary port M, the storage system unit number C having a built-in secondary port C, the secondary clustering storage system number C and storage system unit number D having a logical volume M, the path M, the logical volume M, the distance A between the storage system units, and the distance C between the storage system units are presented to the user through the host computer 180 or the maintenance terminal. In other words, there may be provided a function of previously presenting information necessary to determine the path to the user.

Figure 16:
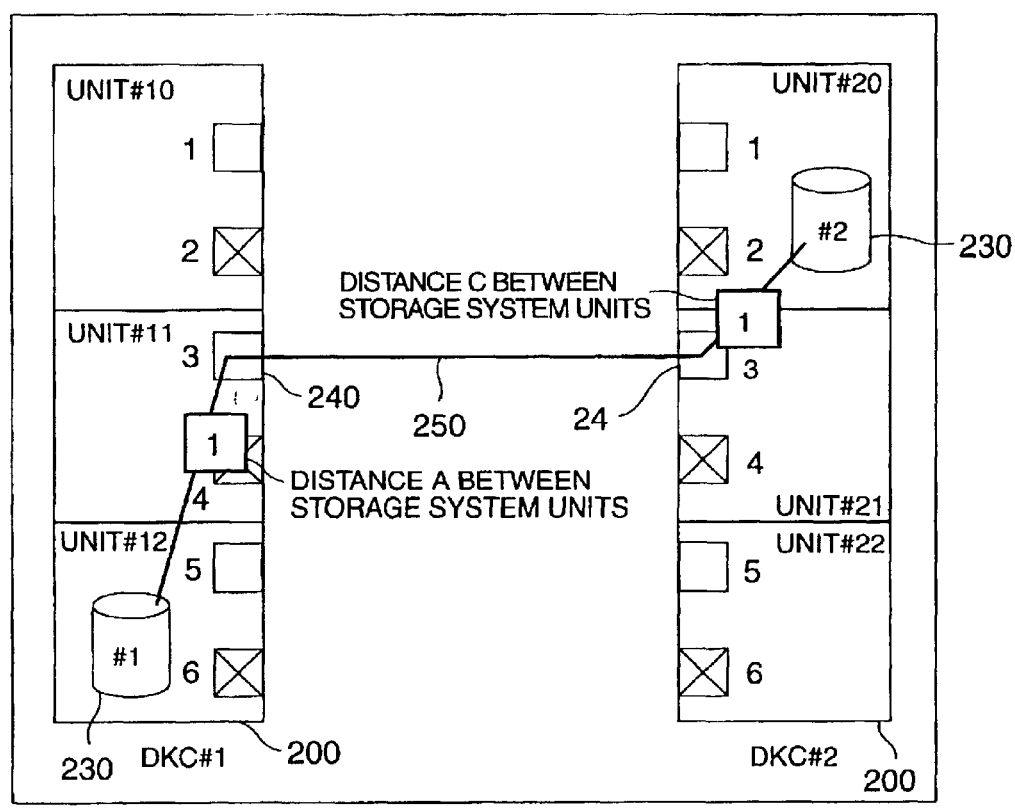
FIG. 16 is a diagram showing an example of presentation of a path M to a user.

FIG. 16 is a diagram showing an example of information presented to the user.

FIG. 16 shows that the storage system unit A containing the copy source logical volume A (#1 in FIG. 16) is unit #12, the storage system unit M containing the primary port 3 is unit #11, the storage system unit C containing the secondary port 3 is unit #21, the secondary clustering storage system C holding the logical volume M (#2 in FIG. 16) is DKC #2, the storage system unit D is unit #20, the distance A between the storage system units is 1, and the distance C between the storage system units is 1.

When information shown in FIG. 16 is presented to the user, the user refers to the presented distance A between the storage system units and distance C between the storage system units to decide whether backup is made using the path M and the logical volume M.

For example, it is assumed in the state shown in FIG. 16 that the presented distance A between the storage system units is not zero, namely data transfer is made between the storage system units in the clustering storage system A.

In this case, the user may back up data through the shown route but may also consider installing an additional port to the storage system unit A or increasing the storage capacity of the storage system unit M containing the primary port 3 so as to move the data stored in the storage system unit A into the storage system unit M. In the latter case, the performance of the system as the whole is improved by performing the considered result.

For example, when the user adds a port to the storage system unit #12 as shown in FIG. 16, determines it as a primary port, connects it to the port 3 of the secondary clustering storage system DKC #2 and uses the path between them, it is possible to reduce the distance A between the storage system units.

Such consideration may also be made for the secondary clustering storage system 200.

For example, when data transfer is made between the storage system units in the secondary clustering storage system C, the user adds the port to the storage system unit #20 of FIG. 16, uses the added port as the secondary port, connects it to the port 3 of the clustering storage system DKC #1, and uses the path between them. Thus, it is possible to reduce the distance C between the storage system units.

In FIG. 16, information was provided to the user about only one set of path M and logical volume M with a minimum sum of the distance A between the storage system units and the distance C between the storage system units. But, not only one set but also a combination of many of them, for example, information indicating some sets of data transfer routes may be presented to the user in increasing order of the sum of the distance A between the storage system units and the distance C between the storage system units. Thus, the user can designate a desired data transfer route.

In the above embodiment, the CHA 110 or the DKA 120 in the control section 211 in the primary clustering storage system 200 performs the path allocation processing. But, this processing may be performed by the CHA 110 or the DKA 120 in the control section 211 in the secondary clustering storage system C. Besides, this processing may be performed by the host computer 180 or the maintenance terminal. In such a case, the primary or secondary clustering storage system 200 must notify the host computer 180 or the maintenance terminal of the port information 300, the volume information 400, the pair information 500, the primary-to-secondary path information 600, and the distance information 700 between the storage system units.

Through the above processing, the secondary clustering storage system and the secondary logical volume corresponding to the backup source logical volume 230 are determined.

Then, an operation when the primary clustering storage system 200 has received a write instruction to the logical volume 230 to which backup is performed will be described. In the present invention, when the priority of the path used for backup is determined for the logical volume 230 by the path allocation processing described above, the primary clustering storage system 200 selects the path having a high priority to back up data. When the path is not determined to have a priority but only one path is determined as the path, this path is used. The case in that the path has the priority allotted will be described.

Figure 13:
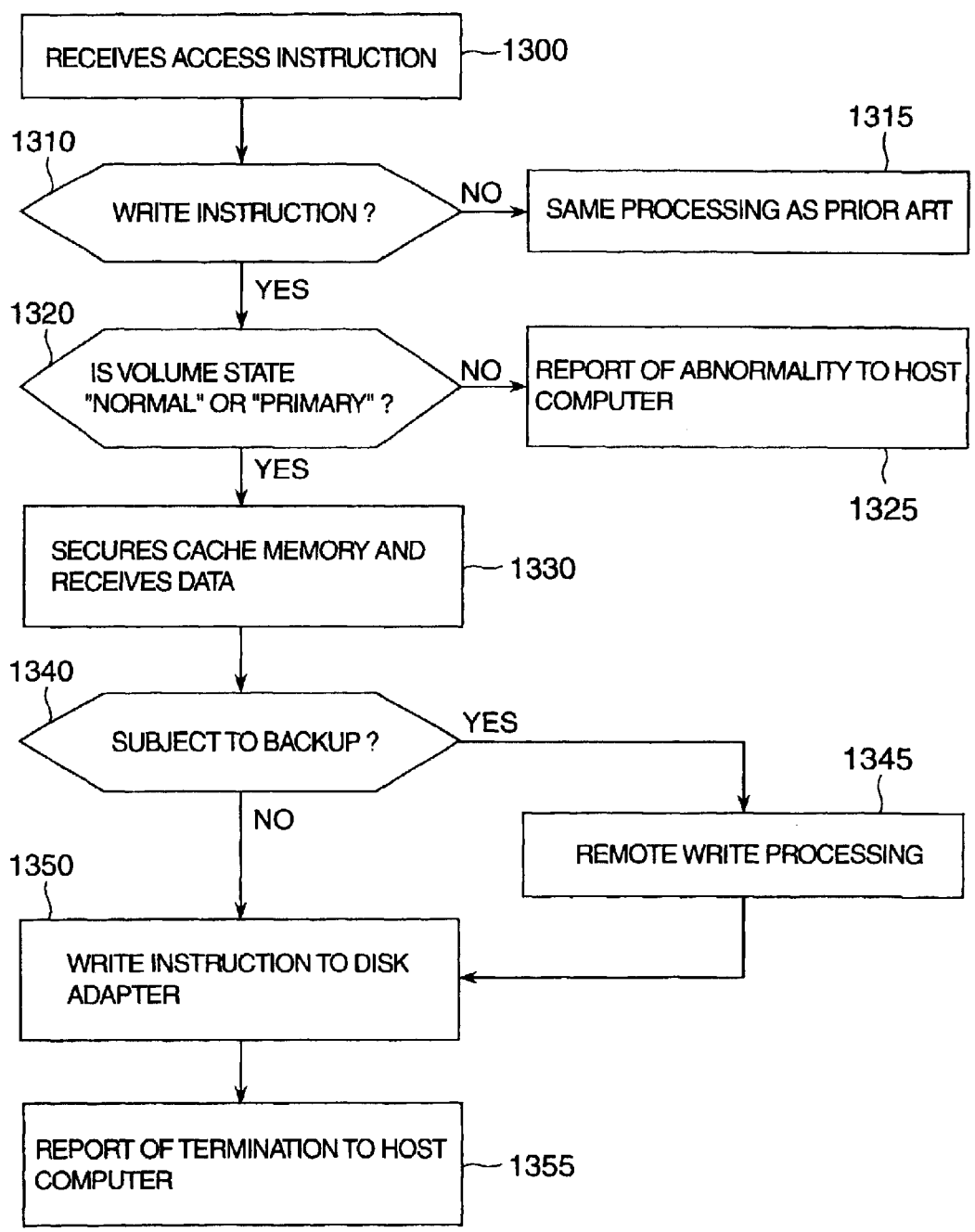
FIG. 13 is a flow chart illustrating an operation of the clustering storage system which has received a write instruction.

FIG. 13 is a flow chart showing a process when the primary clustering storage system 200 has received an access instruction from the host computer 180.

The CHA 110 in the control section 211 of the primary clustering storage system 200 receives an access instruction from the host computer. The CHA 110 having received the access instruction is called CHAA hereinbelow. The access instruction includes the instruction to read or write, the logical address subject to the instruction, an amount of data and the like. The logical address is comprised of a logical volume number and a logical volume inside location. It is assumed in the following description that the logical address in the access instruction is logical address A, the logical volume number is logical volume A, the logical volume inside location is logical volume inside location A, and the amount of data is data amount A (step 1300).

The CHAA checks whether the access instruction is a write instruction or not (step 1310). When the access instruction is not the write instruction but a read instruction for example, the primary clustering storage system 200 performs the read processing in the same way as a related art (step 1315).

When the access instruction is a write instruction, CHAA refers to the volume information 400 of the logical volume A to check the volume state (step 1320). When the volume state of the logical volume A is other than "normal" or "primary", it is impossible to access the logical volume A, so that the primary clustering storage system 200 reports the abnormal termination to the host computer 180 (step 1325).

When the volume state of the logical volume A is either "normal" or "primary", the CHAA secures an area for the CACHE 130 within the storage system unit containing the logical volume A and notifies the host computer 180 that it is ready to receive data. The host computer 180 having received the notification sends the write data to the primary clustering storage system 200. The CHAA receives the write data and stores the received data in the area secured in the CACHE 130 (step 1330).

The CHAA refers to the volume information 400 of the logical volume A to check whether the logical volume A is a subject to be backed up or not (step 1340). When the volume state is "primary" in step 1340, the CHAA performs a remote write process to the secondary logical volume to be described later because the logical volume A is a subject to be backed up (step 1345).

When the volume state is "normal" in step 1340 or after the remote write processing in step 1345 is completed, the CHAA instructs the DKA 120 to write the data which is stored in the CACHE 130 to the storage 150 and reports the termination to the host computer 180 (steps 1350, 1355). Then, the instructed DKA 120 stores the data in the storage 150.

Next, the remote write processing to the secondary logical volume will be described. It is assumed in the following description that the pair number of the logical volume A is pair number A. The path number set of the pair number A consists of n path numbers, which are path A1, path A2, path A3, . . . , path An. Here, the smaller the n, the higher the priority level is. Such a priority is previously determined by performing path allocation processing of the logical volume A. The secondary logical volume 230 of the logical volume A is determined as the secondary logical volume C.

Figure 14:
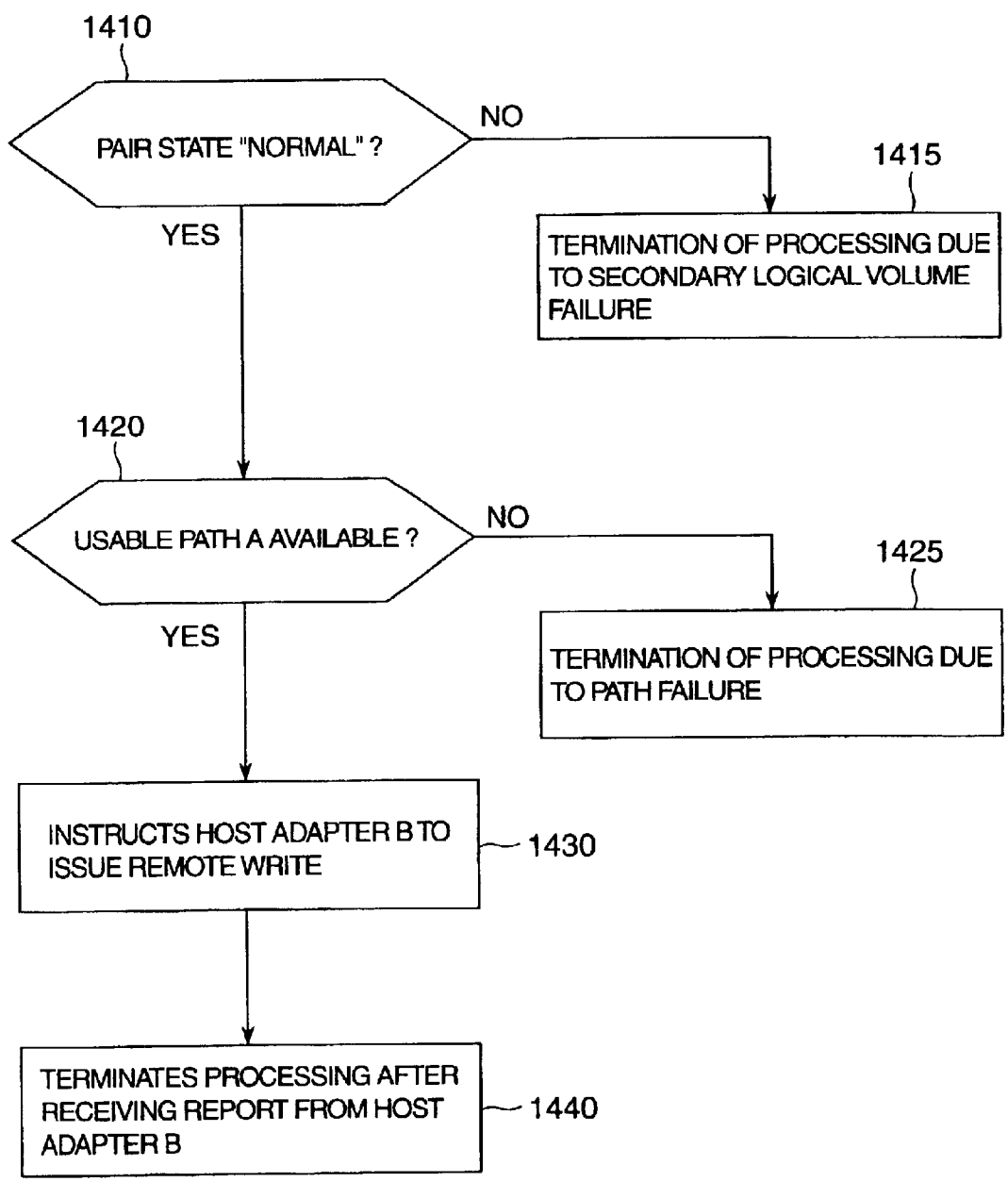
FIG. 14 is a flow chart illustrating remote write processing of a CHA which has received an access instruction.

FIG. 14 is a flow chart showing a procedure of the remote write processing of the CHAA having received the access instruction.

The CHAA refers to the pair information 500 of the pair number A to check the pair state (step 1410). When the pair state is not "normal" in step 1410, data cannot be written to the secondary logical volume 230, so that the primary clustering storage system 200 terminates the processing as a secondary logical volume failure (step 1415).

When the pair state is "normal" in step 1410, the CHAA checks the path state of the path A1 (step 1420). When the path state is not "normal", the path A1 cannot be used, so that the CHAA checks the path state in order of paths A2, A3, . . . , An to obtain the path A which has a path state of "normal".

When there is not a path A which has the path state of "normal", all the paths 250 connected to the secondary clustering storage system C are unusable, so that the primary clustering storage system 200 terminates the processing (step 1425). In the following description, the primary port number of the path A is primary port B, and the CHA 110 which controls the primary port B is CHAB. And, the secondary port number of the path A is a secondary port C, and the CHA 110 which controls the secondary port C is a CHAC.

When there is the path A having the path state of "normal" in step 1420, the CHAA instructs the CHAB to issue a write instruction (remote write instruction) to the secondary logical volume C through the path A. The remote write instruction includes information indicating a write instruction, a logical address indicating the secondary logical volume C and the logical volume inside location A, and data amount A (step 1430). Processing between the CHAB and the CHAC will be described later.

The CHAA terminates the processing upon receiving the termination report about the remote write processing from the CHAB (step 1440).

Figure 15:
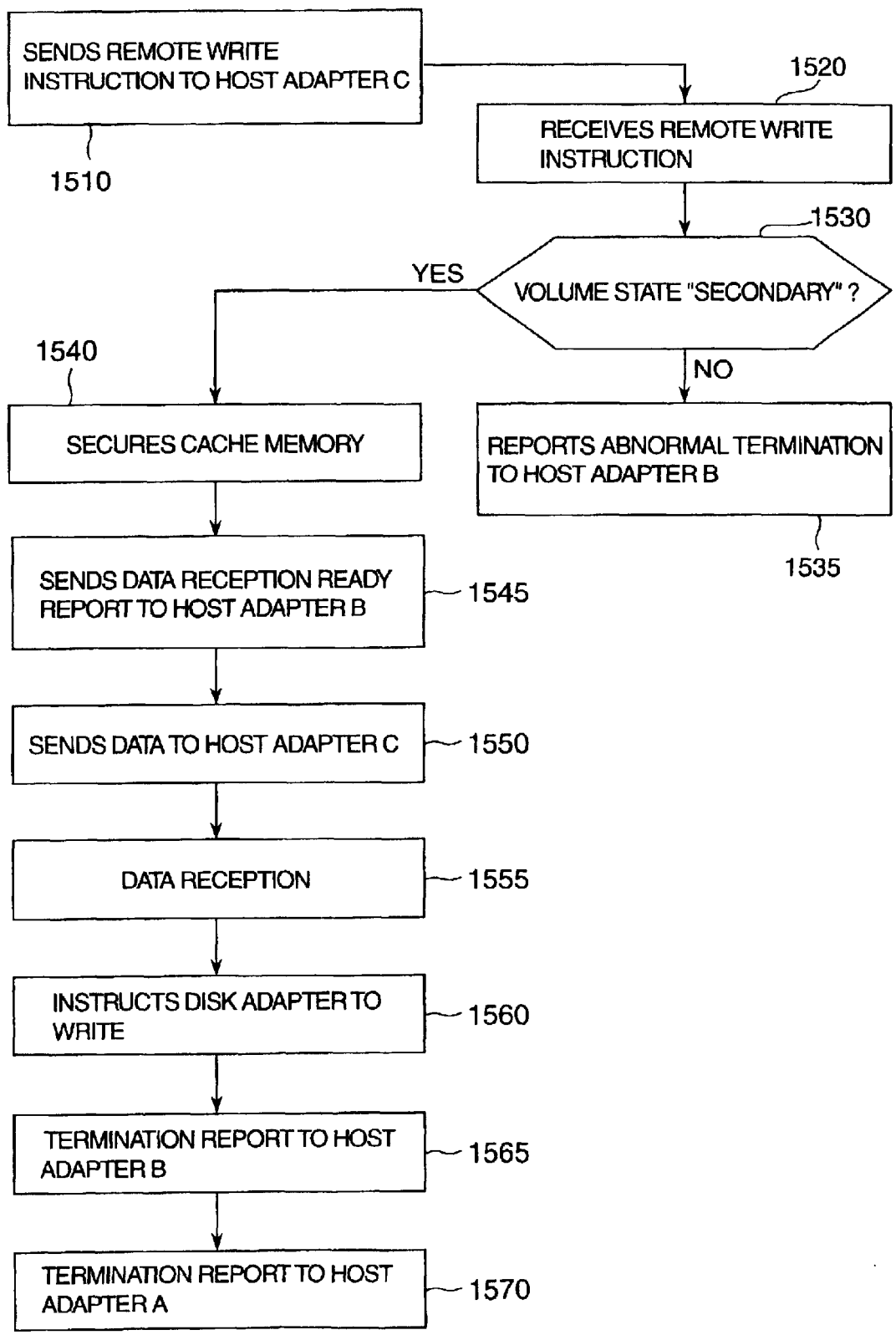
FIG. 15 is a flow chart illustrating remote write processing between a primary clustering storage system and a secondary clustering storage system.

FIG. 15 is a flow chart showing a procedure of the remote write processing between the CHAB of the primary clustering storage system 200 and the CHAC of the secondary clustering storage system.

The CHAB uses the primary port B to send the remote write instruction to the secondary port C (step 1510).

The CHAC of the secondary clustering storage system C receives the remote write instruction. The CHAC refers to the volume information 400 to check the volume state of the logical volume C. When the volume state of the logical volume C is other than "secondary", access to the logical volume C is impossible, so that the CHAC reports an abnormal termination to the CHAB (steps 1520 to 1535).

When the volume state of the logical volume C is "secondary" in step 1530, the CHAC secures an area of the CACHE 130 within the storage system unit 210 containing the logical volume C and notifies the CHAB that it is ready to receive data (steps 1540, 1545).

The CHAB sends write data to the CHAC upon receiving the data reception ready report from the CHAC (step 1550).

The CHAC receives the write data and stores the data in the area secured in the CACHE 130. The CHAC instructs the DKA 120 to write the data into the storage 150. Then, the CHAC reports the termination to the CHAB (steps 1555 to 1565). Then, the instructed DKA 120 stores the data in the storage 150.

The CHAB receives a report about the termination of the remote write instruction from the CHAC and reports the termination of the remote write instruction to the CHAA (step 1570).

In the above operation when the access instruction was received from the host computer 180, the primary clustering storage system 200 made the termination report to the host computer 180 after the data of the secondary logical volume 230 was updated. But, the primary clustering storage system 200 may instruct the data update of the secondary logical volume 230 after the termination report to the host computer 180.

In this case, in step 1345 of FIG. 13, the primary clustering storage system 200 stores the write instruction, data, reception time of the write instruction which are to be used when the remote write instruction is issued in the CACHE 130 or the storage 150 within the primary clustering storage system. After the termination report to the host computer 180, the primary clustering storage system 200 performs the remote write processing in order of the received time of the write instruction.

The remote write processing is performed in order of the received time of the write instruction or in desired order. But, when the remote write processing is performed in a desired order in order to keep the consistency of data, it is necessary that the reception time of the write instruction is sent together with the write instruction to the secondary clustering storage system 200, and the secondary clustering storage system 200 stores the data in order of the time of reception of the write instruction in the storage 150.

Thus, the response time to the host computer 180 can be reduced. The CHAA and the CHAB may be the same CHA or a different CHA.

As described above, the path is previously registered in the pair information 500 by the path allocation processing and the path registered in the path number set of the pair information 500 is used for the backup of the logical volume, so that the backup can be made by both of the primary clustering storage system 200 and the secondary clustering storage system 200 through a route with a smaller load. Especially, the path can be determined with higher flexibility by giving the priority to the registered paths. Thus, the amount of data transfer between the storage system units can be reduced, and the performance of the clustering storage system 200 can be improved.

According to the present invention, the amount of data transfer between the storage system units within the clustering storage system produced for the backup of data can be reduced, and the performance of the clustering storage system can be improved.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of data copying from a primary clustering storage system to a secondary clustering storage system, wherein each of said primary clustering storage system and said secondary clustering storage system comprises plural storage units and connection lines coupling two storage units, each storage unit comprising a plurality of logical volumes and a port coupled to another clustering storage system, and each logical volume in a storage unit of a clustering storage system being accessible from a port of a different storage unit in the same clustering storage system via said connection lines, said method comprising:

(a) specifying a candidate secondary logical volume from among said logical volumes in said secondary clustering storage system, so that copy data of a primary logical volume in said primary clustering storage system can be transmitted and stored to said candidate secondary logical volume;

(b) specifying at least one candidate route through which copy data of said primary logical volume can be transmitted to said candidate secondary logical volume;

(c) for each candidate route, obtaining an evaluation of a first path between a storage unit comprising said primary logical volume and a port in said primary clustering storage system on said candidate route;

(d) for each candidate route, obtaining an evaluation of a second path between a storage unit comprising said candidate secondary logical volume and a port in said secondary clustering storage system on said candidate route; and (e) determining a route used for transmitting copy data from said primary logical volume to said candidate secondary logical volume according to said evaluation of a first path and said evaluation of a second path, wherein said evaluation of a first path is obtained based on information concerning said connection lines in said primary clustering storage system, which is stored in a storage unit in said primary clustering storage system, and said evaluation of a second path is obtained based on information concerning connection lines in said secondary clustering storage system, which is stored in a storage unit in said secondary clustering storage system.

2. A method of data copying according to claim 1, wherein said evaluation of a first path is a distance evaluation of said first path, and said evaluation of a second path is a distance evaluation of said second path.

3. A method of data copying according to claim 1, wherein said evaluation of a first path is an evaluation of a data transfer speed of said first path, and said evaluation of a second path is an evaluation of a data transfer speed of said second path.

4. A method of data copying according to claim 1, wherein said step of specifying a candidate of a secondary logical volume comprises selecting plural candidate secondary logical volumes, for each candidate secondary logical volume, said specifying at least one candidate route, said obtaining evaluation of a first path, and said obtaining evaluation of a second path are performed, wherein said determining a route comprises:

selecting a first candidate secondary logical volume; and determining a route between said primary logical volume and said first candidate secondary logical volume according to said evaluation of a first path and said evaluation of a second path.

5. A method of data copying according to claim 4, wherein said plural candidate secondary logical volumes are selected based on at least one of a size of said primary logical volume, a format type of said primary logical volume, or a status of said primary logical volume.

6. A storage system configured for data copying comprising:

a primary clustering storage system comprising plurality of primary storage units;

a plurality of primary logical volumes defined in each primary storage unit; and a secondary clustering storage system comprising a plurality of secondary storage units;

a plurality of secondary logical volumes defined in each secondary storage unit, a plurality of first data lines to provide data communication among said primary storage units;

a plurality of second data lines to provide data communication among said secondary storage units; and a plurality of third data lines between said primary storage units and secondary storage units;

said primary clustering storage system is operable to perform a data copying operation wherein data stored on a source primary logical volume can be copied to a secondary logical volume, including performing steps of:

specifying a candidate secondary logical volume from among said secondary logical volumes;

specifying at least one candidate data route between said source primary logical volume and said candidate secondary logical volume;

for said at least one candidate data route, evaluating a first path between a storage unit comprising said source primary logical volume and a port in said primary clustering storage system to produce a first evaluation result;

for said at least one candidate data route, evaluating a second path between a storage unit comprising said candidate secondary logical volume and a port in said secondary clustering storage system to produce a second evaluation result; and determining a route used for transmitting copy data from said source primary logical volume to said candidate secondary logical volume according to said first evaluation result and said second evaluation result, wherein said first evaluation result is obtained based on information stored in one of said primary storage units concerning said first data lines, and said second evaluation result is obtained based on information stored in one of said secondary storage units concerning said second data lines.

7. The system of claim 6 wherein said first evaluation result is a distance evaluation of said first path, and said second evaluation result is a distance evaluation of said second path.

8. The system of claim 6 wherein said first evaluation result is a data transfer speed of said first path, and said second evaluation result is a data transfer speed of said second path.

9. The system of claim 6 wherein said step of specifying a candidate secondary logical volume comprises:

selecting plural candidate secondary logical volumes; and performing said specifying at least one candidate route, said evaluating a first path, and said evaluating a second path for each candidate secondary logical volume, wherein said determining a route comprises:

selecting a first candidate secondary logical volume; and determining a route between said source primary logical volume and said first candidate secondary logical volume according to said evaluating of a first path and said evaluating of a second path.

* * * * *